(12) United States Patent
Taylor

(10) Patent No.: US 7,432,618 B2
(45) Date of Patent: Oct. 7, 2008

(54) INVERTER ANTI-ISLANDING METHOD

(75) Inventor: Bill Taylor, Bend, OR (US)

(73) Assignee: PV Powered, Inc., Bend, OR (US)

( * ) Notice: Subject to any disclaimer, the term of this patent is extended or adjusted under 35 U.S.C. 154(b) by 58 days.

(21) Appl. No.: 11/400,716

(22) Filed: Apr. 7, 2006

(65) Prior Publication Data
US 2006/0250024 A1   Nov. 9, 2006

Related U.S. Application Data

(60) Provisional application No. 60/669,487, filed on Apr. 7, 2005.

(51) Int. Cl.
  H01H 47/20 (2006.01)
  H01H 83/12 (2006.01)
  H02H 3/24 (2006.01)
(52) U.S. Cl. .................... 307/129; 361/44; 361/49
(58) Field of Classification Search .......... 307/129; 361/44, 49
See application file for complete search history.

(56) References Cited

U.S. PATENT DOCUMENTS

| | | | |
|---|---|---|---|
| 6,101,073 A | 8/2000 | Takehara | |
| 6,107,784 A * | 8/2000 | Nomiya et al. | 323/205 |
| 6,201,180 B1 | 3/2001 | Meyer et al. | |
| 6,320,769 B2 * | 11/2001 | Kurokami et al. | 363/56.03 |
| 6,429,546 B1 * | 8/2002 | Ropp et al. | 307/31 |
| 6,593,520 B2 | 7/2003 | Kondo et al. | |
| 6,713,890 B2 | 3/2004 | Kondo et al. | |
| 6,750,391 B2 | 6/2004 | Bower et al. | |
| 6,803,515 B2 | 10/2004 | Itoyama et al. | |
| 6,810,339 B2 * | 10/2004 | Wills | 702/65 |
| 6,812,396 B2 | 11/2004 | Makita et al. | |
| 6,856,497 B2 | 2/2005 | Suzui et al. | |
| 6,897,370 B2 | 5/2005 | Kondo et al. | |
| 6,927,955 B2 * | 8/2005 | Suzui et al. | 361/42 |
| 6,930,868 B2 * | 8/2005 | Kondo et al. | 361/42 |
| 7,106,564 B2 * | 9/2006 | Deng et al. | 361/62 |
| 2001/0023703 A1 | 9/2001 | Kondo et al. | |
| 2002/0085325 A1 | 7/2002 | Suzui et al. | |
| 2002/0105765 A1 | 8/2002 | Kondo et al. | |
| 2002/0186020 A1 | 12/2002 | Kondo et al. | |
| 2002/0195138 A1 | 12/2002 | Itoyama et al. | |
| 2003/0067723 A1 | 4/2003 | Suzui et al. | |
| 2003/0075211 A1 | 4/2003 | Makita et al. | |
| 2003/0111103 A1 | 6/2003 | Bower et al. | |
| 2005/0045224 A1 | 3/2005 | Lyden | |

* cited by examiner

Primary Examiner—Stephen W Jackson
Assistant Examiner—Hal I Kaplan
(74) Attorney, Agent, or Firm—Perkins Coie LLP

(57) ABSTRACT

A method for detecting and interrupting an electrically islanded condition for a grid connected current source inverter is disclosed in which: A line voltage frequency is monitored at a cycle or sub cycle resolution. Current output from the inverter is periodically phase shifted. If voltage is observed to follow the phase shift of the current output an islanding error signal is generated causing the inverter to stop injecting power onto the line.

12 Claims, 2 Drawing Sheets

INVERTER ANTI-ISLANDING METHOD

RELATED APPLICATIONS

This application claims priority under 35 U.S.C. § 119(e) to U.S. Provisional Patent Application No. 60/669,487 which was filed on Apr. 7, 2005, incorporated herein by reference. Co-pending patent application Ser. No. 11/187,059 is also incorporated herein by reference.

FIELD OF THE INVENTION

The invention relates to an inverter, specifically to a technique for avoiding an electrically islanded condition in a grid-connected inverter.

BACKGROUND OF THE INVENTION

The solar energy industry is expanding at a rapid pace. Much of that expansion is due to increases in residential and small commercial photovoltaic (PV).installations. Increasingly these installations are directly connected to the utility grid without the use of batteries. Inverters are the power electronics equipment that convert DC electricity produced by PV panels (collectively a PV array) into the AC required by a utility grid.

Islanding is a phenomena where the grid becomes de-energized due to a power outage or other event, and a distributed generation device (a solar inverter, for example) continues to produce power, resulting in an unsafe condition for utility line workers. Underwriters Laboratories (UL) requires a distributed generation device to disconnect from the grid within two seconds after the grid voltage goes down. Sometimes a distributed generation device will "hold up" the grid voltage as it continues to push current through a low impedance load that happens to be balanced with the output of the inverter, essentially masking the grid fault at its terminals and the inverter will continue to produce power. This rare but possible situation is called islanding when the voltage at an inverter's terminals does not go below safety set points (and thus the inverter does not shut down), even though the grid is no longer present.

SUMMARY OF THE INVENTION

In the present invention, an islanded condition of a grid-connected inverter is detected by shifting the phase of current injection from the inverter into the grid periodically (for example on every 10th cycle or 166.667 ms for a 60 Hz grid). Under normal operation, the relatively "stiff" voltage of the grid will not be affected by a phase shift of current injection from a small (relative to the grid) current source. In an islanded situation, the line voltage will follow the phase-shift of the output current. A frequency detection circuit is provided that detects voltage frequency on a cycle-by-cycle basis. The current phase-shift is such that if the voltage shifts phase along with the current, the frequency detection circuit will recognize a frequency change and the unit will then detect a frequency that is over or under the preset limits stored in memory, causing a safe shutdown of the inverter.

Additional features and advantages, according to the invention in its various embodiments, will be apparent from the remainder of this disclosure.

BRIEF DESCRIPTION OF THE DRAWINGS

Features and advantages, according to embodiments of the invention, will be apparent from the following Detailed Description taken in conjunction with the accompanying drawings, in which.

DETAILED DESCRIPTION OF THE DRAWINGS

A method of islanding detection and interruption for a grid-tied inverter is disclosed herein. The method disclosed is for detecting an islanded condition for a grid-connected controllable current source, specifically for detecting an islanded condition for a grid connected solar power inverter.

Figure 1:
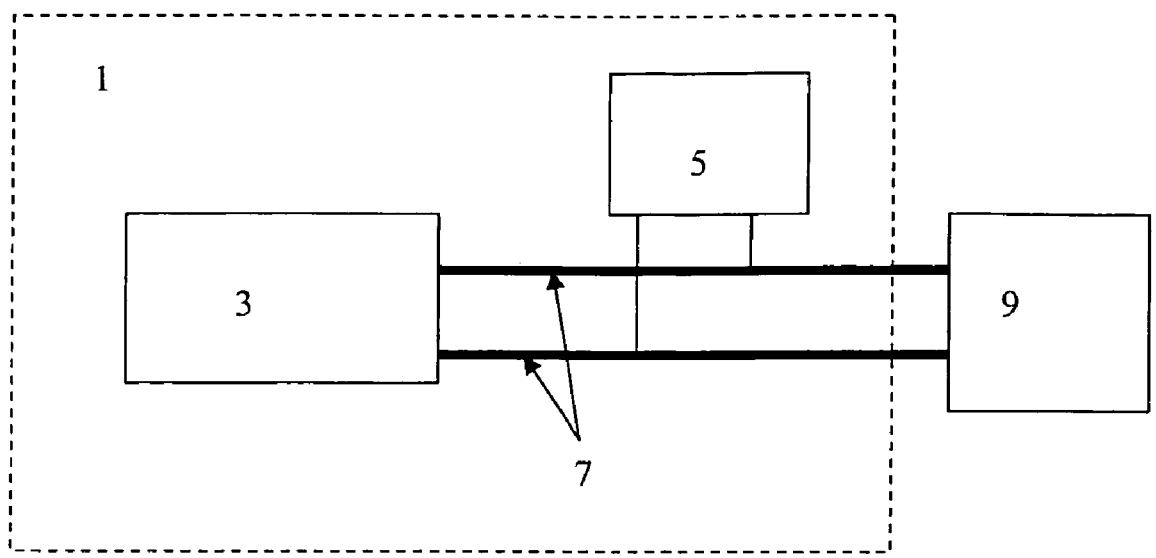
FIG. 1 shows a circuit for islanding detection and interruption according to an embodiment of the present invention.

FIG. 1 shows the basic physical components of the present invention. An inverter 1 contains a controllable current source 3 and a voltage sense circuit 5. Output lines 7 from the inverter 1 connect to a utility grid 9. A controllable current source 3 injects current into the output lines 7 and a voltage sense circuit 5 monitors the voltage on the output lines 7.

Figure 2:
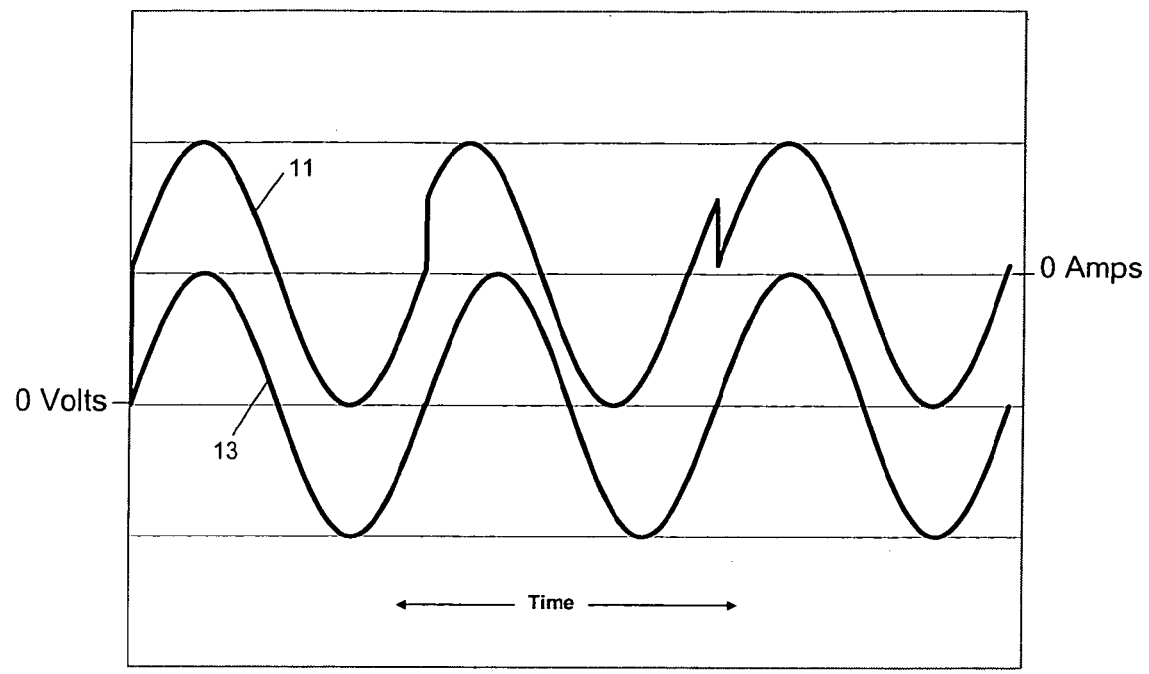
FIG. 2 shows current and voltage wave forms of an inverter output using the method of the present-invention in the condition of a stable grid.

FIG. 2 shows a current waveform 11 and a voltage waveform 13 as could be seen on an oscilloscope monitoring the electrical output of an inverter during employment of the islanding detection and interruption method of the present invention in a normal grid tied scenario. In FIG. 2, the current waveform 11 is abruptly shifted ahead at one point (by 33.75 degrees in this example) and shifted back at another point (once cycle later in this example), but the voltage waveform 13 follows the grid at a steady, un-shifted frequency. A circuit in the inverter 1 observes the unperturbed nature of the voltage waveform 13 and continues normal operation. In embodiments of the present invention, the circuit which observes the voltage wave form is a frequency detection circuit with cycle or sub-cycle resolution.

Figure 3:
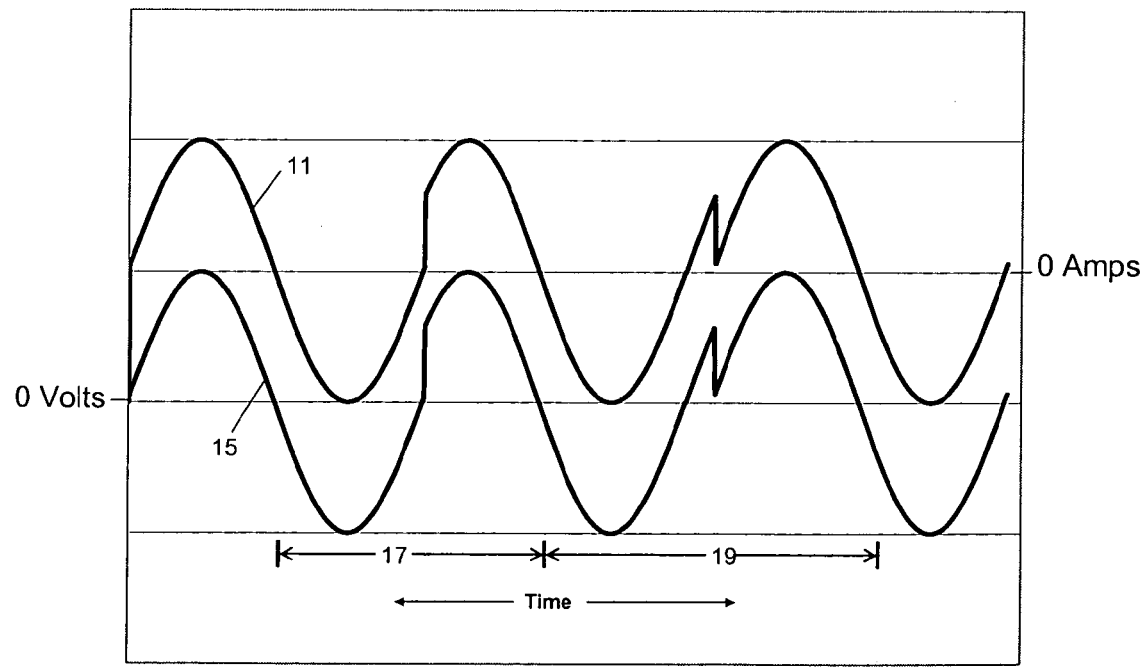
FIG. 3 shows current and voltage wave forms of an inverter output using the method of the present invention in an islanded condition.

FIG. 3 shows a current waveform 11 and a voltage waveform 15 as could be seen on an oscilloscope monitoring the output of an inverter during employment of the islanding detection and interruption method of the present invention in an islanded scenario. In FIG. 3, the current waveform 11 is abruptly shifted ahead at one point (by 33.75 degrees in this example) and shifted back at a second point (one cycle later in this example) and the voltage waveform 15 follows the current shift. The voltage frequency for a first cycle 17 is lower (54.4 Hz in FIG. 3) and in a second cycle 19 the voltage frequency is higher (65.6 Hz in FIG. 3) than that considered normal (60 Hz in FIG. 3). A circuit in the inverter observes the phase shift of the voltage waveform 15 and sends an error signal initiating shut down of the inverter or otherwise halts current injection into the grid. In embodiments of the present invention, the circuit which observes the voltage waveform is a frequency detection circuit with cycle or sub-cycle resolution and over/under frequency programmed set points which will be exceeded if the voltage waveform 15 follows the current waveform 11.

Which direction the phase of the current output is shifted is arbitrary and this disclosure is intended to cover either direction or pattern of directions and magnitudes of phase shifting. Either direction of phase shifting will produce a high and a low-frequency cycle, but the direction of phase shift will determine if there is a high then a low-frequency cycle, or conversely a low then a high-frequency cycle.

In the method of the present invention, a compromise must be made between speed of detecting an islanded condition and overall power quality. If a phase shift in current output occurs every cycle, then an islanded condition can be detected quickly, but the inverter will have poor power quality since the phase of current output will often be out of phase with grid voltage. Conversely, if the current is phase shifted only once a second (every sixty cycles for a sixty Hertz grid), there are only one or two chances to detect a fault within the two-second period required. A period of approximately ten cycles between phase shifts has been determined to be a good compromise in one implementation of the present invention. For a 60 Hertz grid, a ten cycle interval will give twelve chances for an inverter to detect the grid fault condition.

It has been found experimentally that an effective implementation is to alter the direction of phase shift in pairs. For instance, if a first phase shift is forward, the second phase shift (e.g. ten cycles later) will be forward, the third phase shift will be backward, the forth phase shift will be backward, the fifth phase shift will be forward, and the pattern will repeat.

While a method and embodiments of the present invention have been shown and described, it will be apparent to those skilled in the art that various modifications may be made without departing from the scope of the invention. Therefore, it is intended that the invention not necessarily be limited to the particular embodiments described and illustrated herein.

What is claimed is:

1. An inverter connected to a photovoltaic panel comprising:
    an anti-islanding monitor, wherein the anti-islanding monitor is configured to:
        detect a loss of an AC power grid connected to the inverter and disconnect the connection to the AC power grid when the AC power grid is lost; and
        modify AC current periodically and detect a loss of the AC power grid if AC voltage is also modified when the AC current is modified, wherein modifying the AC current includes shifting a phase of the AC current forward in half of the modifications of the AC current and shifting a phase of the AC current backward in half of the modifications of the AC current.

2. The inverter of claim 1 wherein the anti-islanding monitor detects a loss of AC power grid by detecting an over or under frequency condition during a period when the phase of the AC current is shifted.

3. The inverter of claim 1 wherein the AC current is out of phase with the voltage in the AC power grid for one cycle each time the anti-islanding monitor checks for loss of the AC power grid.

4. The inverter of claim 1 wherein the AC current is out of phase with the voltage in the AC power grid for one cycle each time the anti-islanding monitor checks for loss of the AC power grid.

5. The inverter of claim 1 wherein the anti-islanding monitor checks for loss of the AC power grid once every ten cycles.

6. The inverter of claim 1 wherein the phase shift in AC current is less than 40 degrees forward or backward.

7. The inverter of claim 1 wherein the sequence of phase shifts is forward, forward, backward, backward.

8. An inverter connected to a photovoltaic panel comprising:
    an anti-islanding monitor that detects a loss of an AC power grid and stops operation of the inverter when the AC power grid is lost, wherein the anti-islanding monitor is configured to:
        modify AC current periodically and detect a loss of the AC power grid if AC voltage is also modified when the AC current is modified, wherein modifying the AC current includes shifting a phase of the AC current forward in half of the modifications of the AC current and shifting a phase of the AC current backward in half of the modifications of the AC current.

9. The inverter of claim 8 wherein the anti-islanding monitor detects a loss of the AC power grid if AC voltage is also modified when the AC current is modified.

10. The inverter of claim 8 wherein the AC current is out of phase with the voltage in the AC power grid for one cycle each time the anti-islanding monitor checks for loss of the AC power grid.

11. The inverter of claim 8 wherein the anti-islanding monitor checks for loss of the AC power grid once every ten cycles.

12. A method of operating an inverter connected to a photovoltaic panel comprising:
    providing a photovoltaic panel, an output of which is DC power;
    providing a set of transistors electrically connected to the photovoltaic panel that controllably convert the DC power into AC power;
    connecting to the output of the transistors to an AC power grid;
    monitoring for loss of the AC power grid, wherein monitoring includes shifting the phase of the AC current output of the transistors to a sequence of forward, forward, backward, backward, and checking for a modification in AC voltage when the AC current is modified; and
    interrupting operation of the inverter when the AC power grid is lost.

* * * * *

UNITED STATES PATENT AND TRADEMARK OFFICE
CERTIFICATE OF CORRECTION

PATENT NO.       : 7,432,618 B2                                      Page 1 of 1
APPLICATION NO. : 11/400716
DATED            : October 7, 2008
INVENTOR(S)      : Bill Taylor It is certified that error appears in the above-identified patent and that said Letters Patent is hereby corrected as shown below:

In column 1, line 23, delete "(PV)." and insert -- (PV) --, therefor.

In column 2, line 10, delete "present-invention" and insert -- present invention --, therefor.

Signed and Sealed this

Thirteenth Day of January, 2009

JON W. DUDAS
*Director of the United States Patent and Trademark Office*